US010503265B2

(12) United States Patent
Viswanathan

(10) Patent No.: US 10,503,265 B2
(45) Date of Patent: Dec. 10, 2019

(54) MIXED-MODE DEPTH DETECTION

(71) Applicant: Microvision, Inc., Redmond, WA (US)

(72) Inventor: P. Selvan Viswanathan, Bellevue, WA (US)

(73) Assignee: Microvision, Inc., Redmond, WA (US)

(*) Notice: Subject to any disclaimer, the term of this patent is extended or adjusted under 35 U.S.C. 154(b) by 319 days.

(21) Appl. No.: 14/848,128

(22) Filed: Sep. 8, 2015

(65) Prior Publication Data
US 2017/0068319 A1  Mar. 9, 2017

(51) Int. Cl.
*G06F 3/01* (2006.01)
*G01S 7/481* (2006.01)
*G01S 17/89* (2006.01)
*G01S 17/08* (2006.01)
*G06T 7/00* (2017.01)
*H04N 5/33* (2006.01)
*H04N 5/225* (2006.01)
*G06T 7/521* (2017.01)
*G01S 17/46* (2006.01)

(52) U.S. Cl.
CPC ............ *G06F 3/017* (2013.01); *G01S 7/4817* (2013.01); *G01S 17/46* (2013.01); *G01S 17/89* (2013.01); *G06T 7/521* (2017.01); *H04N 5/2256* (2013.01); *H04N 5/33* (2013.01)

(58) Field of Classification Search
CPC ......... G06F 3/017; G06T 7/0051; H04N 5/33; H04N 5/2256; G01S 17/08; G01S 17/89; G01S 17/4817
USPC ........................................................ 345/156
See application file for complete search history.

(56) References Cited

U.S. PATENT DOCUMENTS 6,115,112 A     9/2000  Hertzman et al.
7,609,875 B2 *  10/2009 Liu .................... A61C 7/00
                                                  359/287

(Continued)

FOREIGN PATENT DOCUMENTS

WO   WO2014014838          1/2014
WO   WO-2014014838 A2 *    1/2014

(Continued)

OTHER PUBLICATIONS

Microvision, Inc., , "International Search Report", dated Nov. 2, 2016.

(Continued)

*Primary Examiner* — Amare Mengistu
*Assistant Examiner* — Jennifer L Zubajlo
(74) *Attorney, Agent, or Firm* — Kevin D. Wills

(57) ABSTRACT

Briefly, in accordance with one or more embodiments, a MEMS laser beam display to implement mixed-mode depth detection comprises an imaging engine to project an image in a field of view of the MEMS laser beam display, a time of flight (TOF) depth detector to determine a distance to a target within the field of view in a first mode of depth detection, wherein the TOF depth detector determines coarse depth data of the target, and a structured light depth detector to determine a distance to the target in a second mode of depth detection, wherein the structured light depth detector determines fine depth data of the target. Depth processing circuitry may generate a composite three-dimensional (3D) image of the target, or may identify a gesture region of the target for gesture recognition.

21 Claims, 13 Drawing Sheets

(56) References Cited

U.S. PATENT DOCUMENTS

| | | |
|---|---|---|
| 8,446,571 B2 | 5/2013 | Fiess et al. |
| 8,913,037 B1* | 12/2014 | Liu ........................ G06F 3/0425 |
| | | 345/175 |
| 8,970,827 B2* | 3/2015 | Bloom ............... G02B 26/0841 |
| | | 356/5.01 |
| 8,992,050 B1* | 3/2015 | Yuan ...................... G03B 21/14 |
| | | 362/293 |
| 9,002,058 B2 | 4/2015 | Viswanathan et al. |
| 9,052,579 B1* | 6/2015 | Poulad ................. G03B 21/145 |
| 9,092,136 B1* | 7/2015 | Patel .................... G06F 3/04886 |
| 9,098,931 B2* | 8/2015 | Shpunt ............... G01B 11/2518 |
| 9,196,067 B1* | 11/2015 | Freed ...................... G06T 11/60 |
| 9,204,121 B1* | 12/2015 | Marason ............ G01B 11/2513 |
| 9,267,787 B2 | 2/2016 | Shpunt |
| 9,462,255 B1* | 10/2016 | Marason ................. G01B 11/25 |
| 9,465,484 B1* | 10/2016 | Kamarshi ............... G06F 3/042 |
| 9,651,417 B2 | 5/2017 | Shpunt et al. |
| 9,677,878 B2 | 6/2017 | Shpunt et al. |
| 2008/0007722 A1* | 1/2008 | Golab ................ G01B 11/2545 |
| | | 356/139.09 |
| 2010/0322477 A1* | 12/2010 | Schmitt ................... G01S 17/00 |
| | | 382/103 |
| 2013/0107000 A1 | 5/2013 | Xue et al. |
| 2013/0206967 A1* | 8/2013 | Shpunt ................... G06T 15/00 |
| | | 250/216 |
| 2013/0235441 A1 | 9/2013 | Davis et al. |
| 2013/0257748 A1* | 10/2013 | Ambrus ............. G02B 27/0093 |
| | | 345/173 |
| 2014/0211193 A1* | 7/2014 | Bloom ............... G02B 26/0841 |
| | | 356/5.01 |
| 2014/0282224 A1* | 9/2014 | Pedley .................... G06F 3/017 |
| | | 715/784 |
| 2014/0282274 A1* | 9/2014 | Everitt .................... G06F 3/017 |
| | | 715/863 |
| 2014/0362253 A1* | 12/2014 | Kim ....................... H04N 5/262 |
| | | 348/231.4 |
| 2015/0024336 A1 | 1/2015 | Blassing et al. |
| 2015/0062558 A1 | 3/2015 | Jagannatha |
| 2015/0085075 A1* | 3/2015 | Hudman ............ G02B 19/0057 |
| | | 348/46 |
| 2015/0192677 A1 | 7/2015 | Yu et al. |
| 2015/0193664 A1 | 7/2015 | Marti et al. |
| 2015/0286340 A1* | 10/2015 | Send ........................ G01S 17/46 |
| | | 345/175 |
| 2016/0006914 A1* | 1/2016 | Neumann ............. G06F 3/0325 |
| | | 348/78 |
| 2016/0182788 A1* | 6/2016 | Wan ................... H04N 5/23219 |
| | | 348/370 |
| 2016/0182789 A1* | 6/2016 | Wan ...................... H04N 5/2256 |
| | | 348/370 |
| 2016/0195386 A1 | 7/2016 | Yoon et al. |
| 2016/0321502 A1* | 11/2016 | Kamath ................. G06Q 30/00 |
| 2017/0090032 A1 | 3/2017 | Ridderbusch |
| 2017/0090034 A1 | 3/2017 | Ridderbusch |
| 2017/0153319 A1 | 6/2017 | Villeneuve et al. |
| 2017/0176596 A1 | 6/2017 | Shpunt et al. |
| 2017/0205873 A1 | 7/2017 | Shpunt et al. |
| 2017/0244955 A1 | 8/2017 | Shpunt et al. |

FOREIGN PATENT DOCUMENTS

| | | |
|---|---|---|
| WO | WO2015024871 | 2/2015 |
| WO | WO-2015024871 A1 * | 2/2015 |
| WO | WO2015077455 | 5/2015 |

OTHER PUBLICATIONS

Salvi, et al., "Pattern Codification Strategies in Structured Light Systems", Pattern Recognition, vol. 37, Issue 4, Apr. 1, 2004.

Microvision, Inc., , "Supplementary European Search Report".

* cited by examiner

MIXED-MODE DEPTH DETECTION

BACKGROUND

Time of flight (TOF) methods for depth detection may be utilized to determine a depth or a distance of a target from a display or other device. A microelectromechanical system (MEMS) laser beam display may incorporate a modulated infrared (IR) light source to dispatch multiple interrogation pulses onto a target during predetermined slots in the scanning cycle. The reflected pulses are detected, and the difference in time between a pulse trigger and the return pulse, the time of flight, is determined. The round trip distance may be calculated using the speed of light so that the depth or distance to the target may be determined. With a spatially separated high rate of IR interrogation pulses, the computed depth data when rasterized using the scanning parameters yields a depth map of the display field of view (FOV) or a sub-region in the FOV that may be determined programmatically. The spatial resolution of the depth map might be limited by the cumulative latencies in the IR pulsing and TOF detector circuitries and scanning parameters of the display. To obtain a higher resolution fine depth map, might require multiple IR laser diodes and or duplication of components in the receive circuitry. Alternatively, oversampling with a single IR laser beam may yield a higher resolution depth map but would increase the processing latency (reduced frame rate of depth map acquisition) and impede low latency gesture recognition in the FOV. Gesture recognition and 3D image capture in general may benefit from a low latency higher resolution depth map without the overheads in the approaches described above.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
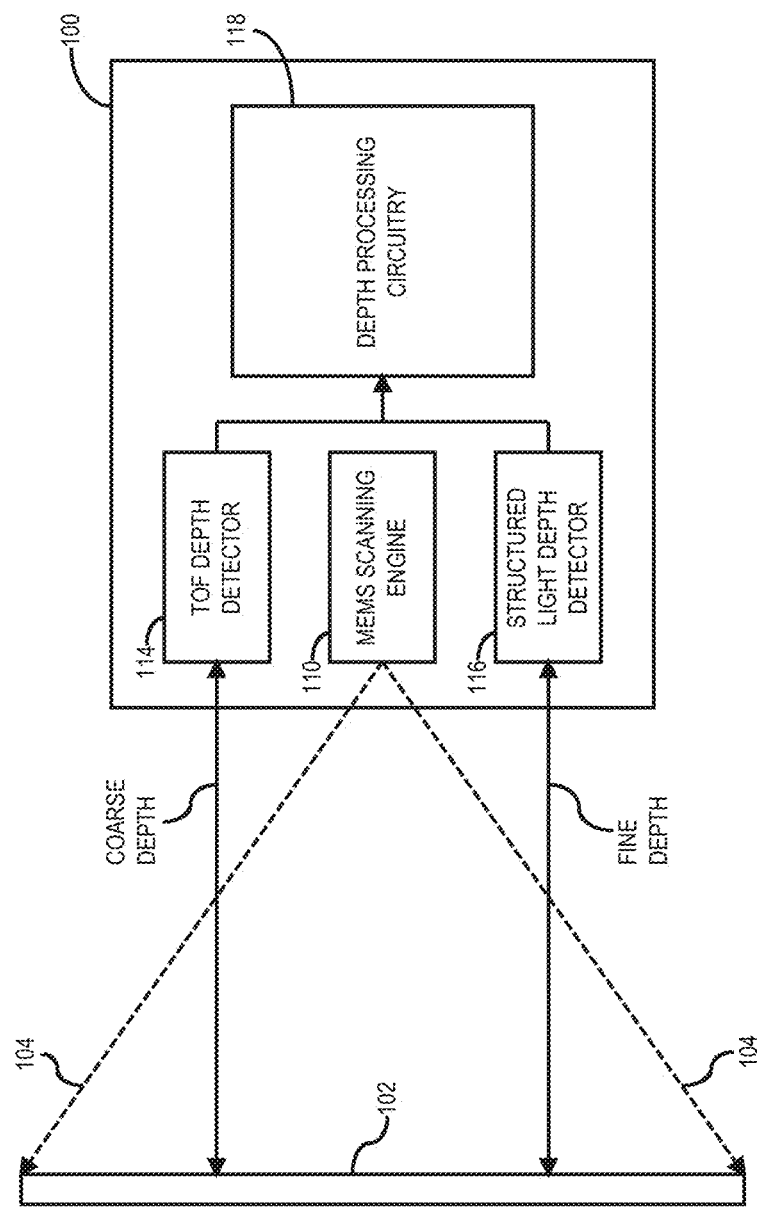
FIG. 1 is a block diagram of a MEMS laser beam display utilizing mixed-mode depth detection in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1, a block diagram of a MEMS laser beam display utilizing mixed-mode depth detection in accordance with one or more embodiments will be discussed. As shown in FIG. 1, display 100 comprise MEMS based projector comprising a microelectromechanical system (MEMS) scanning engine 110 that is capable of projecting an image onto a target 102 via one or more scanned beams 104. The scanned beams 104 may comprise collimated light beams or laser beams that are visible light beams, for example red, green, or blue light beams, and/or invisible light beams, for example infrared beams. The MEMS scanning engine 110 referred to here may be a biaxial single actuator with a mirrored surface or two or more independent actuators with mirrored surfaces on each actuator that in either configuration is actuated to raster scan or project a complex pattern of light beams within a field of view. Either MEMS configuration discussed above may be actuated in one of many methods including and not limited to either or both of electromagnetic and or electrostatic actuation. Although FIG. 1 shows one particular example of display 100 comprising a MEMS display, in one or more alternative embodiments display 100 may comprise other various display technologies such as a digital micromirror device (DMD) based projector, a digital light processor (DLP) based projector, or a liquid-crystal on silicon (LCOS) based projector, and so on, with nominal changes in the circuitry as shown in FIG. 1, and the scope of the claimed subject matter is not limited in these respects. MEMS scanning engine 110 in general may comprise an imaging engine configured to project an image using the technology of various embodiments such as a MEMS scanning mirror, a DMD, or a DLP, and so on, and the scope of the claimed subject matter is not limited in these respects. In embodiments where the MEMS scanning engine 110 comprises an array or mirrors, the light beam might not even be scanned but presented frame sequentially by high speed modulation of the component elements of the MEMS array. Alternatively, MEMS scanning engine 110 may comprise other types of beam scanning engines and the scope of the claimed subject matter is not limited in this respect. For example, MEMS scanning engine 110 alternatively may comprise a nanoscale integrated beam scanner as described in U.S. Published Application US 2013/0235441 A1 which is hereby incorporated herein in its entirety.

Display 100 further may include a time of flight (TOF) depth detector 114 and a structured light depth detector 116 to provide mixed-mode depth detection to detect a depth or distance from display 100 to target 102. In one or more embodiments as will be discussed in further detail, below, TOF depth detector 114 may be utilized to determine a coarse depth (COARSE DEPTH) from display 100 to target 102 in a first mode of depth detection, and structured light depth detector 116 may be utilized to determine a fine depth (FINE DEPTH) from display 100 to target 102 in a second mode of depth detection, although the scope of the claimed subject matter is not limited in this respect. For example, TOF depth detector 114 may comprise an apparatus as described in U.S. Published Application US 2013/0107000 A1 which is hereby incorporated herein in its entirety. In another example, structured light depth detector 116 may use structured light patterns as described in Salvi, Joaqim et al. *Pattern Codification Strategies in Structured Light Systems*, Institut d'Informatica I Aplicacions, Universitat de Girona (Spain) (2005) which is hereby incorporated herein in its entirety. Depth processing circuitry 118 may receive outputs from TOF depth detector 114 and structured light depth detector 116 to process the depth signals for various purposes or routines, for example to identify one or more objects at target 102, to provide a three-dimensional (3D) map of target 102, or to perform gesture recognition of target 150, among other examples, and the scope of the claimed subject matter is not limited in this respect. Further details of TOF depth detector 114, structured light depth detector 116, and depth processing circuitry 118 are shown in and described with respect to FIG. 2, below.

Figure 2:
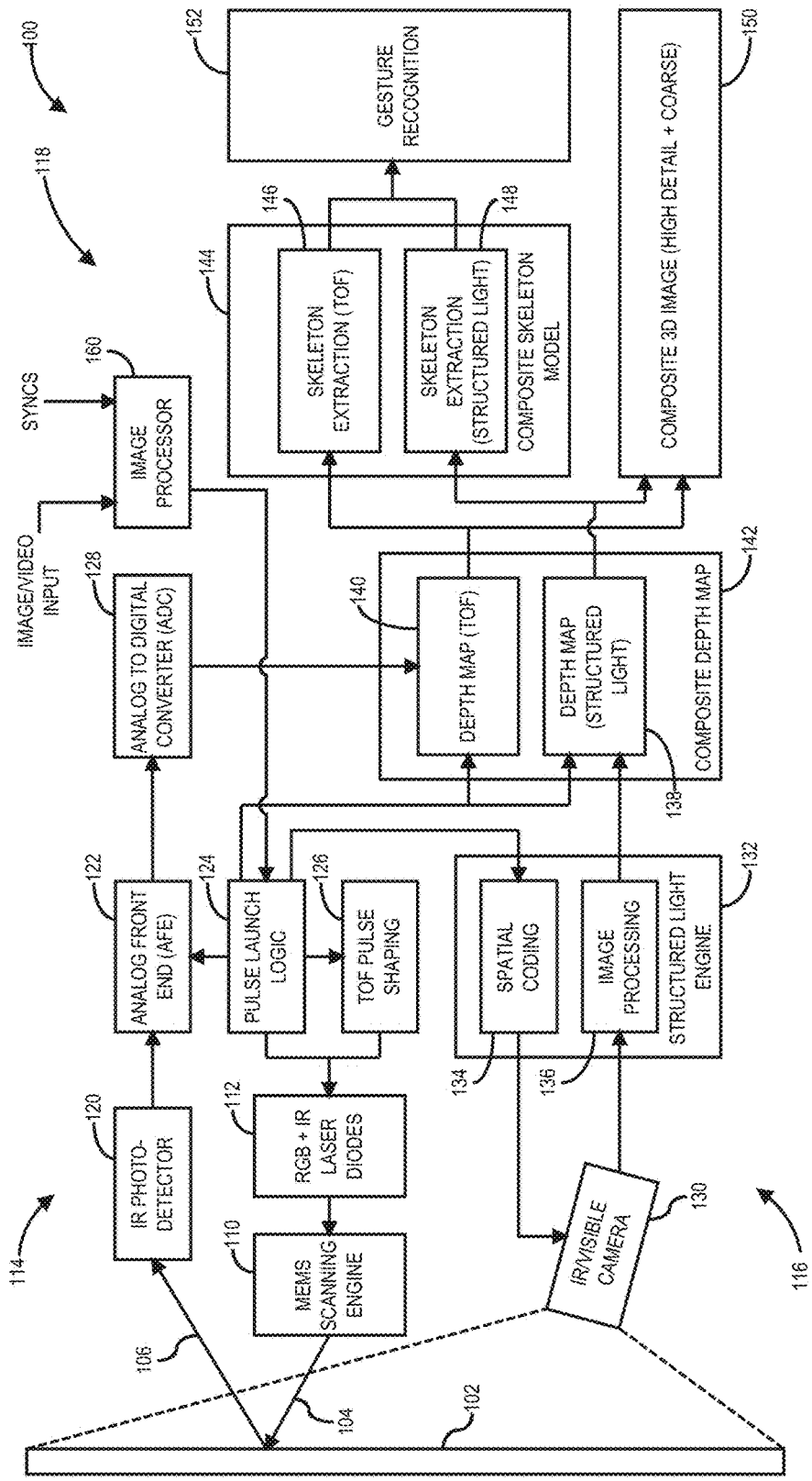
FIG. 2 is a block diagram of the MEMS laser beam display of FIG. 1 showing additional details of the mixed-mode depth detection circuitry in accordance with one or more embodiments.

Referring now to FIG. 2, a block diagram of the MEMS laser beam display of FIG. 1 showing additional details of the mixed-mode depth detection circuitry in accordance with one or more embodiments will be discussed. A shown in FIG. 2, MEMS scanning engine 110 may receive and redirect light received from the red (R), green (G), blue (B), and infrared (IR) laser diodes 112 to project a visible color image on target 102 with the RGB lasers, and to further project an invisible image on target 102 with the IR laser. Image Processor 160 receives a video input signal and corresponding SYNC information and provides RGB+IR laser diodes 112 and pulse launch logic 124 with pixel modulation and timing information. TOF depth detector 114 may include an infrared (IR) photodetector 120 to detect a reflected IR beam 106 reflected off of target 102. The output of photodetector 120 is provided to the Analog Front End (AFE) 122 which may include a transimpedance amplifier (TIA), various gain stages (op-amps), filters, differentiators, cross-point detectors and Time-to-Voltage Converter (TVC) or a Time-to-Delay Converter (TDC). The TVC and TDC essentially function as integrators of voltage or delay corresponding to the TOF of the photons from the transmitter to the detector after reflection. Pulse launch logic circuitry 124 receives timing information from image processor 160 and controls the temporal placement of a modulated RGB and/or IR pulse. Consistent with the embodiments described here, 124 can either directly control the RGB and IR laser diodes in 112 for image and video display and structured light applications and or via TOF Pulse Shaping circuitry 126 for TOF depth detection applications. In still other examples, TOF depth detector might be designed such that the IR photo detector 120 is a matrix sensor (TOF Sensor IC) of a certain resolution that is optically lensed to have a FOV that matches with the display FOV and in such configurations, the components 122 and 128 may be highly integrated into an application specific integrated circuit (ASIC) that also includes the matrix sensor array in the same die or package. Structured light depth detector 116 may comprise camera 130 that is capable of capturing an IR image and/or a visible image projected by MEMS scanning engine 110 onto target 102. The output of camera 130 may be provided to a structured light engine 132 which accepts the captured image from 130 and utilizes the spatial coding information received from 126 to apply transforms in the image processing unit 136 to extract the depth information of the target at 102.

In one or more embodiments, ADC circuitry 128 provides an output to depth map (TOF) circuitry 140 of composite depth map circuitry 142, and image processing circuitry 136 provides an output to depth map (structured light) circuitry 138 of composite depth map circuitry 142. Composite depth map circuitry 142 may generate a composite 3D depth image 150 that is a combination of the coarse depth images obtained by TOF depth detector 114 and the fine/high detail depth images obtained by structured light depth detector 116. Depth map (TOF) circuitry 140 may provide an output to skeleton extraction (TOF) circuitry 146, and depth map (structured light) circuitry 138 may provide an output to skeleton extraction (structured light) circuitry 148 to provide a composite skeleton model 144. The skeleton models may be provided to gesture recognition circuitry 152 to identify one or more forms or structures of target 102, such as the hands and/or fingers of a person, for example to facilitate recognition of gestures provided by a user as an input of an information handling system. It should be noted that depth processing circuitry 118 may be implemented in whole or in part in hardware, or in whole or in part in software, for example as instructions stored on a non-transitory storage medium wherein the instructions, if executed, cause the processor to implement or execute functions of the circuitry shown in FIG. 1, although the scope of the claimed subject matter is not limited in this respect. Examples of how display 100 may use mixed-mode depth detection are described, below.

Figure 3:
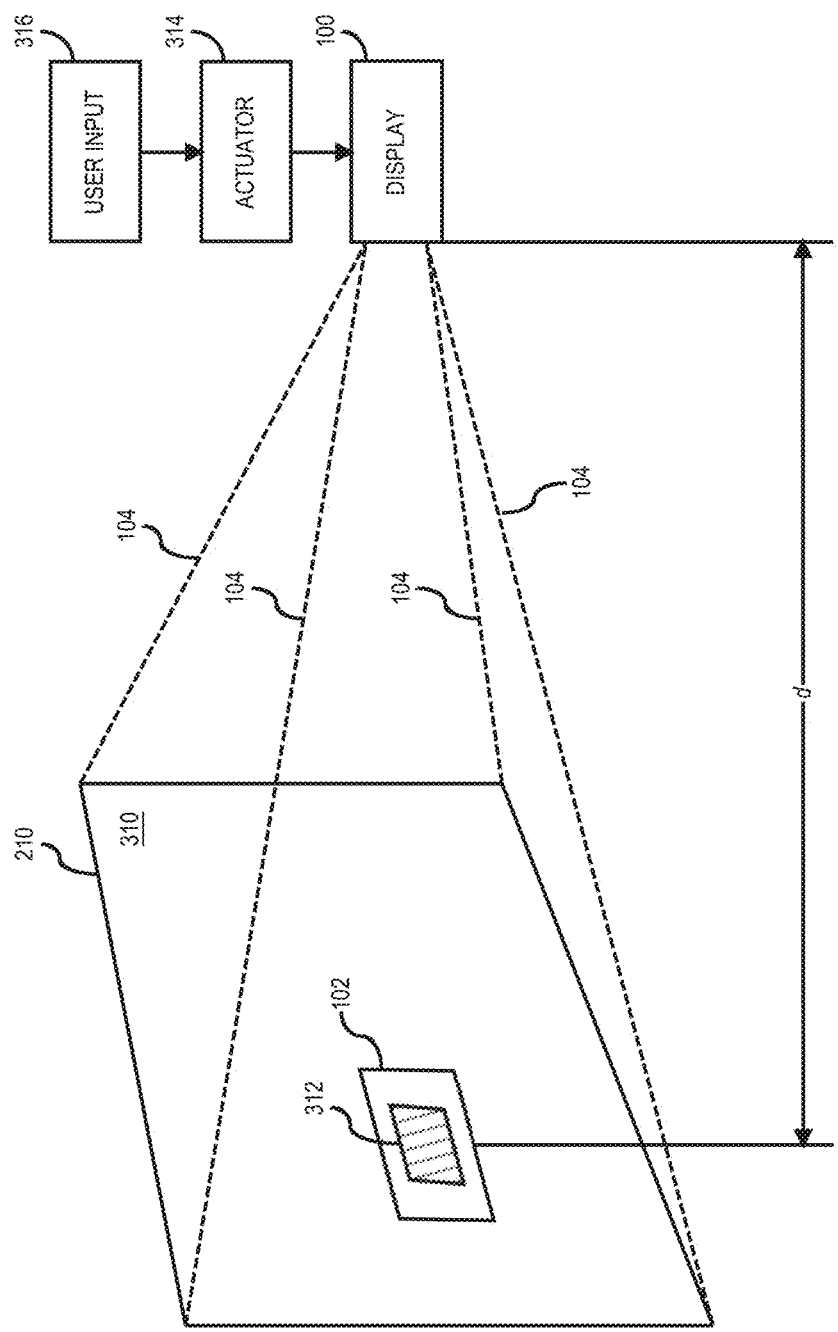
FIG. 3 is an isometric diagram of the display of FIG. 1 showing mixed-mode depth detection of a target within a field of view of the MEMS laser beam display in accordance with one or more embodiments.

Referring now to FIG. 3, an isometric diagram of the display of FIG. 1 showing mixed-mode depth detection of a target within a field of view of the MEMS laser beam display in accordance with one or more embodiments will be discussed. As shown in FIG. 3, display 100 may project one or more scanned beams 104 in a field of view (FOV) 210 in which target 102 may be located. A coarse depth map may be obtained with TOF depth detector 114 in TOF region 310 over part or all of FOV 210. A fine depth map may be obtained with structured light depth detector 116 in structured light region 312 over part or all of FOV 210 from a structured light pattern projected in the structured light region 312 by display 100. In one or more embodiments, the structured light pattern may be a visible structured light pattern projected using any one or more of the visible beams of MEMS scanning engine 110, for example a red, blue, and/or green beam, or may be an invisible structured light pattern using any one or more invisible beams of MEMS scanning engine 100, for example an IR beam. The structured light pattern may be any one or more various patterns that may be utilized to facilitate depth detection and generation of a fine depth map, for example a De Bruijn sequence, binary codes, n-ary codes, hybrid methods, non-formal codification, M-arrays, grey levels, color patterns, and so on such as described in Salvi, Joaqim et al. *Pattern Codification Strategies in Structured Light Systems*, Institut d'Informatica I Aplicacions, Universitat de Girona (Spain) (2005). Structured light patterns generally are classified as time-multiplexed, spatially coded or direct coded, with spatial codification presenting one-shot depth acquisition codes and therefore being well suited for low latency depth acquisition for gesture recognition. It should be noted that these are merely examples of suitable structured light patterns, and the scope of the claimed subject matter is not limited in this respect.

In one or more embodiments, display 100 may use the coarse depth map to detect where target 102 is located within FOV 210, and in particular which part of target 102 on which to project the structured light pattern in structured light region 312 in which to obtain a fine depth map. Depth processing circuitry 118 of display 100 may be utilized to determine where in FOV 210 and/or where on target 102 to project the structured light image in structure light region 312. Alternatively, a user may identify a candidate structured light region 312 and may manually control or steer the projected structure light pattern to the identified structured light region 312 using an user input 316 to an actuator 314 as an input to display 100. For example, actuator 314 may comprise a mouse, joystick, track pad, keyboard, touch input display and so on, manipulated by the user as user input 316 to steer the projected structured light pattern to a desired structured light region 312. User input 316 may also alternatively or simultaneously receive inputs from an eye or gaze tracker or from a sensor or camera that detects fiducials on the target 102. The user may further manipulate the structured light pattern to match the size and/or shape of the desired structured light region 312, for example to increase or decrease the size of the structured light pattern, or rotate or change the shape of structured light pattern, although the scope of the claimed subject matter is not limited in these respects. Example patterns for the various depth detection modes are shown in and described with respect to FIG. 4A through FIG. 4F, below.

Figure 4A:
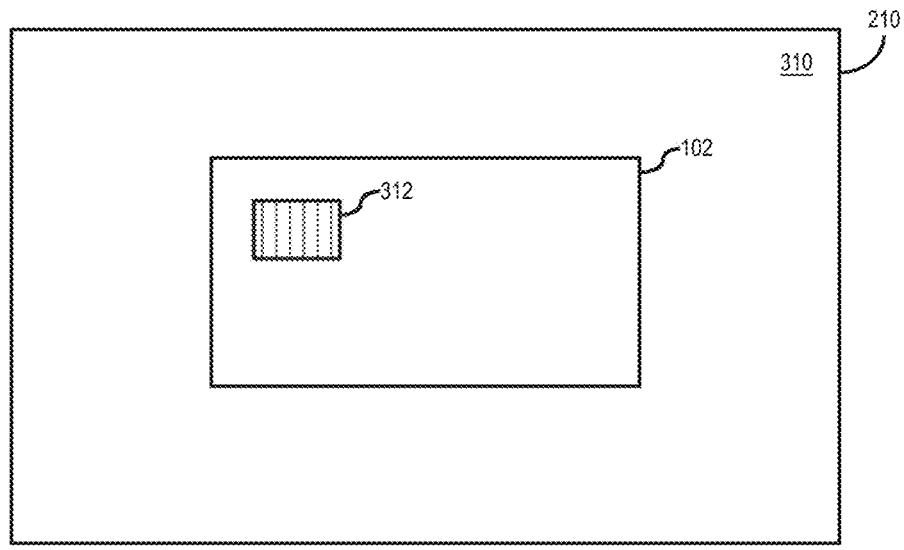
FIG. 4A through FIG. 4F are diagrams of a field of view of the MEMS laser beam display of FIG. 1 illustrating depth detection of a target using a first mode and a second mode over various regions in the field of view in accordance with one or more embodiments.
Figure 4B:
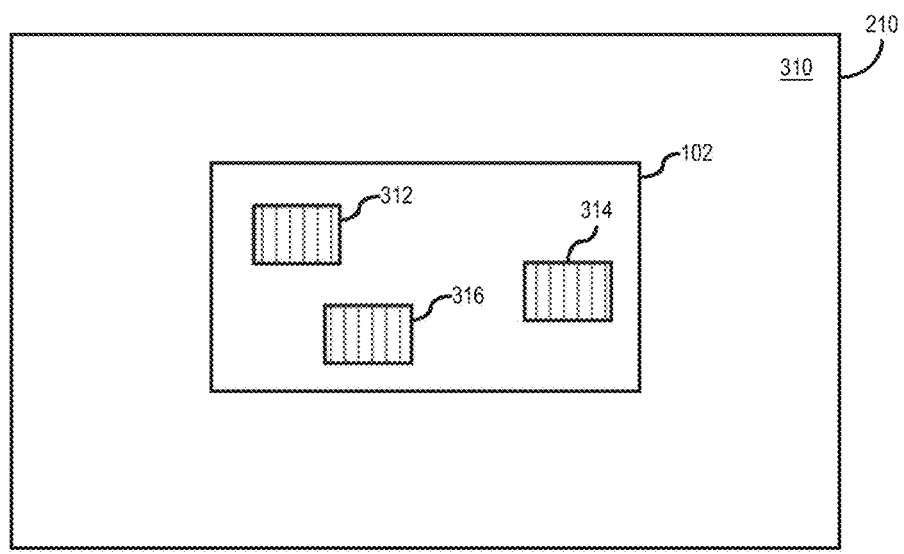
Figure 4C:
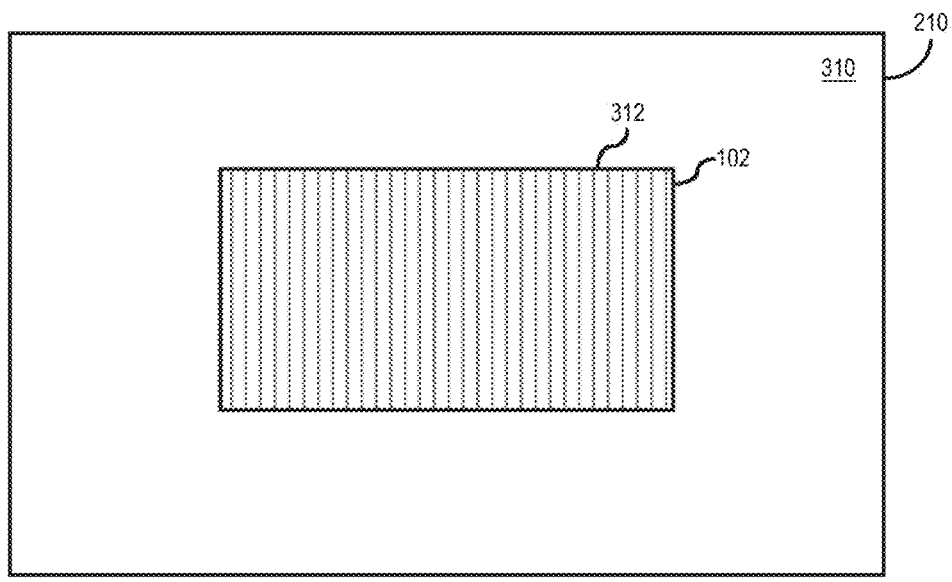
Figure 4D:
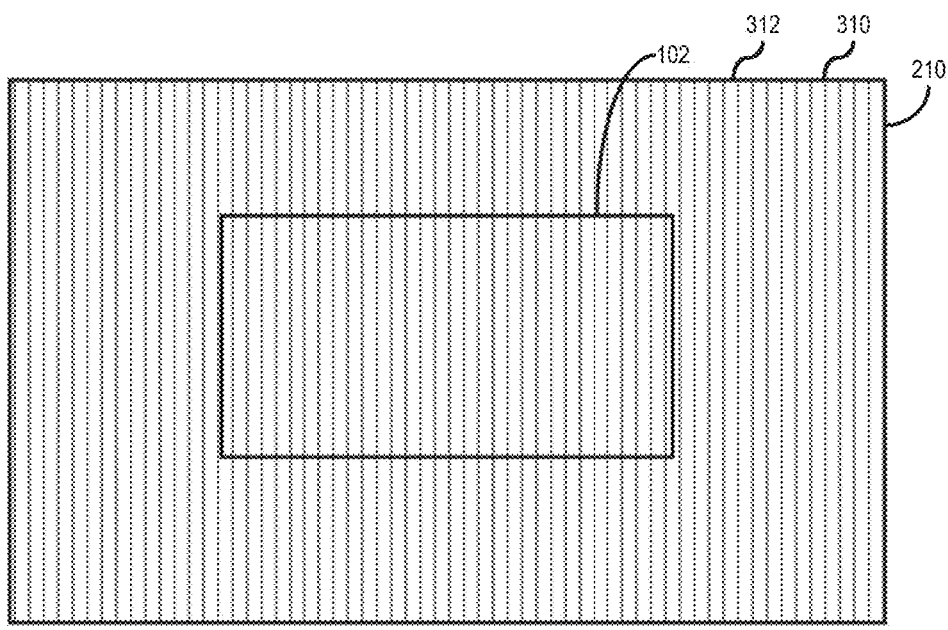
Figure 4E:
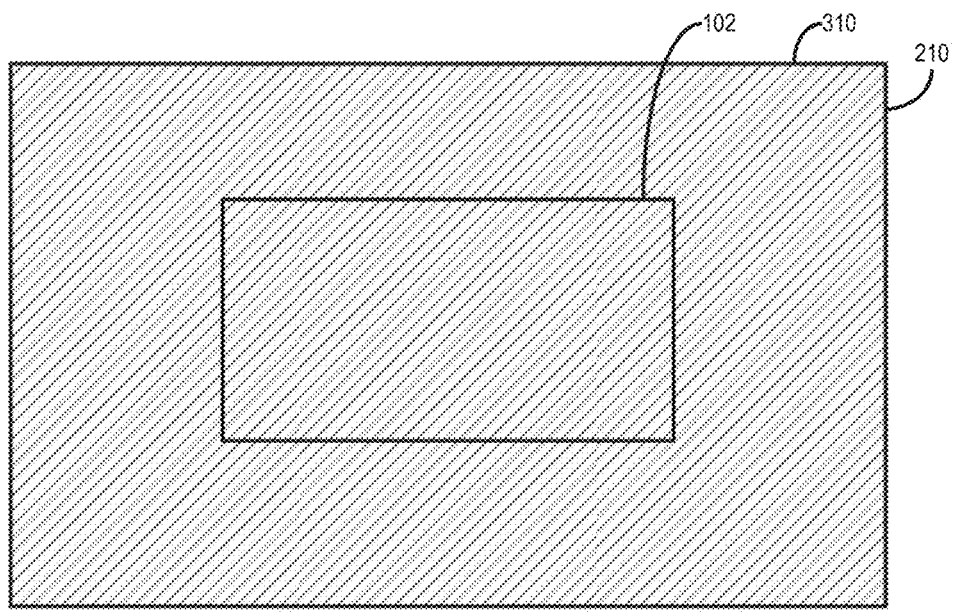
Figure 4F:
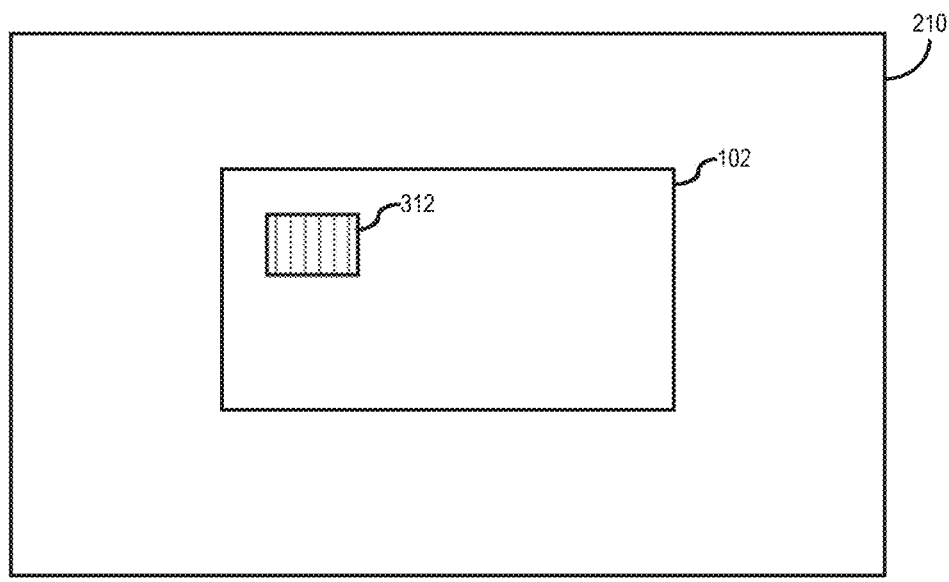

Referring now to FIG. 4A through FIG. 4F, diagrams of a field of view of the MEMS laser beam display of FIG. 1 illustrating depth detection of a target using a first mode and a second mode over various regions in the field of view in accordance with one or more embodiments will be discussed. In FIG. 4A, TOF region 310 may comprise all or nearly all of FOV 210 in which a coarse depth map may be obtained using TOF depth detector 114. Scanned light region 312 may comprise a portion of target 102 in which a fine depth map may be obtained using structured light detector 116. In FIG. 4B, TOF region 310 may comprise all or nearly all of FOV 210, and multiple structured light regions, for example structured light region 312, structured light region 314, or structured light region 316, may comprise multiple portions of target 102 for which a fine depth map may be obtained. In FIG. 4C, TOF region 310 may comprise all or nearly all of FOV 210, and structured light region 312 may coincide with all or nearly all of target 102. In FIG. 4D, both TOF region 310 and structured light region 312 may comprise all or nearly all of FOV 210.

In some embodiments, the coarse depth map and the fine depth map may be obtained simultaneously or nearly simultaneously wherein the TOF region 310 and structured light region 312 overlap in time and/or exist at the same time in one or more frames. In some alternative embodiments, the coarse depth map and the fine depth map may be obtained sequentially so that TOF region 310 and structured light region 312 do not overlap in time and/or do not appear in the same frame. For example, in FIG. 4E TOF region 310 may comprise all or nearly all of FOV 210 without structured light region 312 existing at a first time and/or in a first frame, and in FIG. 4F structured light region 312 may comprise at least a portion of target 102 without TOF region 210 existing at a second time and/or in a second frame. In still other alternative embodiments, the coarse depth map and fine depth map may be obtained sequentially so that TOF region 310 and structured light region 312 do not overlap in time, but are presented in different phases of the scan cycle, for example fine depth map acquisition is performed in the forward scan direction of the FOV and the coarse depth map acquisition is relegated to the vertical retrace period or coarse and fine depth map acquisition is interlaced in the same video frame, that is being temporally separated, but spatially nearly overlapping wherein the overlap extent is dependent on the scanner characteristics. It should be noted that the embodiments shown in FIG. 4A through FIG. 4F are merely examples of how display 100 may utilize mixed-mode depth detection with TOF depth detector 114 and structured light depth detector 116, and the scope of the claimed subject matter is not limited in these respects. An example application of the embodiments of FIG. 4A through FIG. 4F to implement gesture recognition using mixed-mode depth detection is shown in and described with respect to FIG. 5, below.

Figure 5:
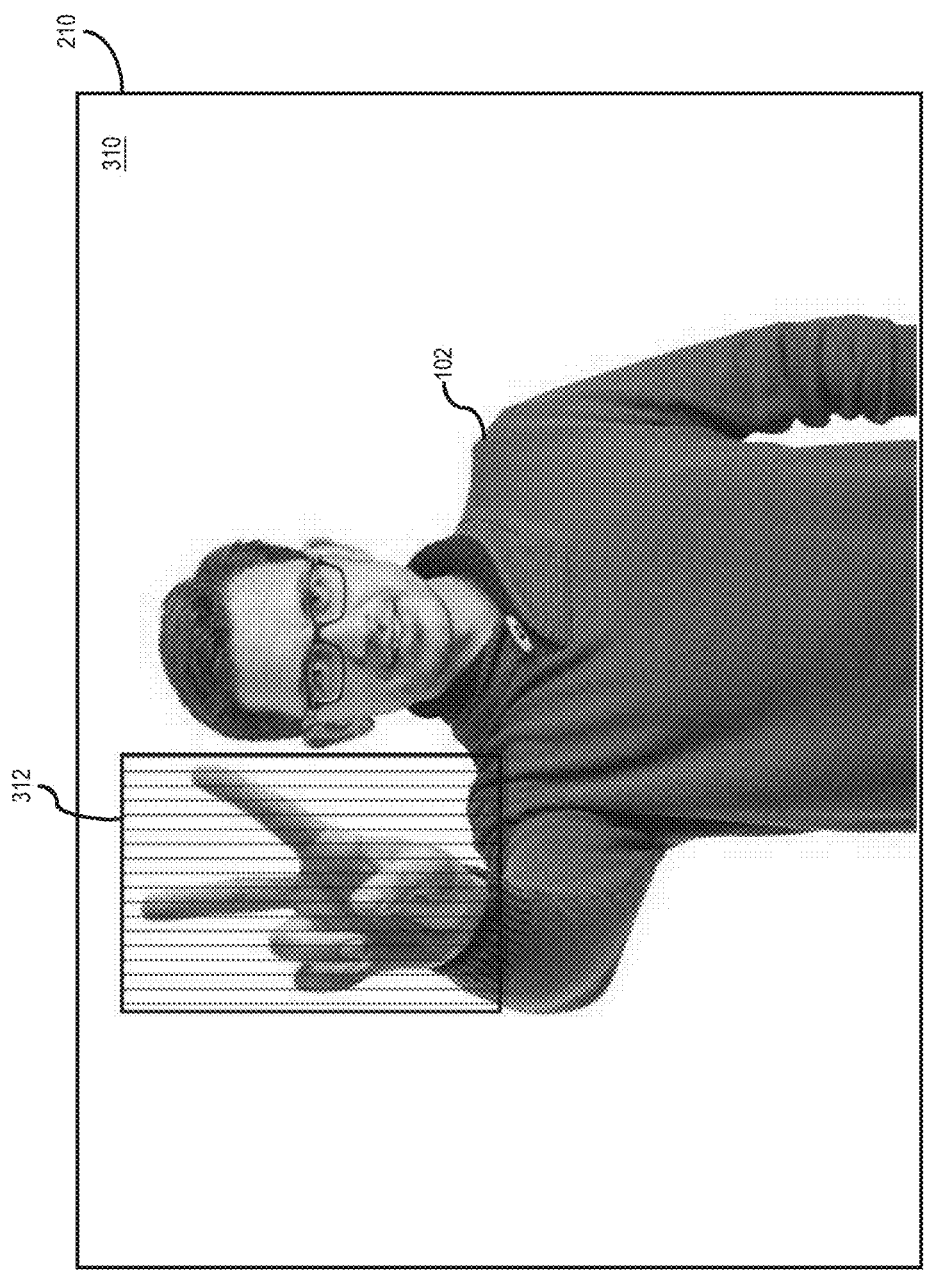
FIG. 5 is a diagram of field of view of the MEMS laser beam display of FIG. 1 illustrating gesture recognition in a selected region of a target within the field of view in accordance with one or more embodiments.

Referring now to FIG. 5, a diagram of field of view of the MEMS laser beam display of FIG. 1 illustrating gesture recognition in a selected region of a target within the field of view in accordance with one or more embodiments will be discussed. As shown in FIG. 5, target 102 may be a person or user who uses various hand and/or finger gestures that may be recognized by display 100. For example, the user may use gestures as input and user interface control to provide input and/or commands to a user interface projected by display 100. In order to recognize the one or more gestures made by the user, FOV 210 of display 100 may be directed to target 102, the user, so that target 102 is at least partially located within FOV 210. In one or more embodiments, TOF depth detector 114 may obtain a coarse depth map in TOF region 310 FOV 210. The coarse depth map may be provided to skeleton extraction (TOF) circuitry 146 to extract a skeleton of target 102, in this case a skeletal model of the person. Using the output of skeleton extraction (TOF) circuitry 146, a structured light region 312 may be automatically or programmatically identified on target 102 in which to obtain a fine depth map to be used for gesture recognition. In the example shown in FIG. 5, the user's hand may be identified as the structured light region 312, and display 100 may project a structured light pattern in the structured light region 312, in this case onto the user's hand and fingers. Structured light depth detector 116 may obtain a fine depth map for structured light region 312 which is provided to skeleton extraction (structured light) circuitry 148 to identify the fine movements of the user's hand and/or fingers in structured light region 312. The outputs of skeleton extraction (TOF) circuitry 146 and skeleton extraction (structured light) circuitry 148 are provided to gesture recognition circuitry 152 to detect and identify the gestures made by the user, and to provide the gestures as user input to display 100 and/or to another device to which display 100 may be connected such as a processor, computer, tablet, phone, and so on. In one or more embodiments, gesture recognition may be performed as described in U.S. Pat. No. 9,002,058 B2 which is hereby incorporated herein by reference in its entirety. It should be noted that the gesture recognition example shown in FIG. 5 is merely one example of using mixed-mode depth detection with display 100, and the scope of the claimed subject matter is not limited in this respect. Various methods of mixed-mode depth detection and/or gesture recognition are shown in and described with respect to FIG. 6 and FIG. 7, below.

Figure 6:
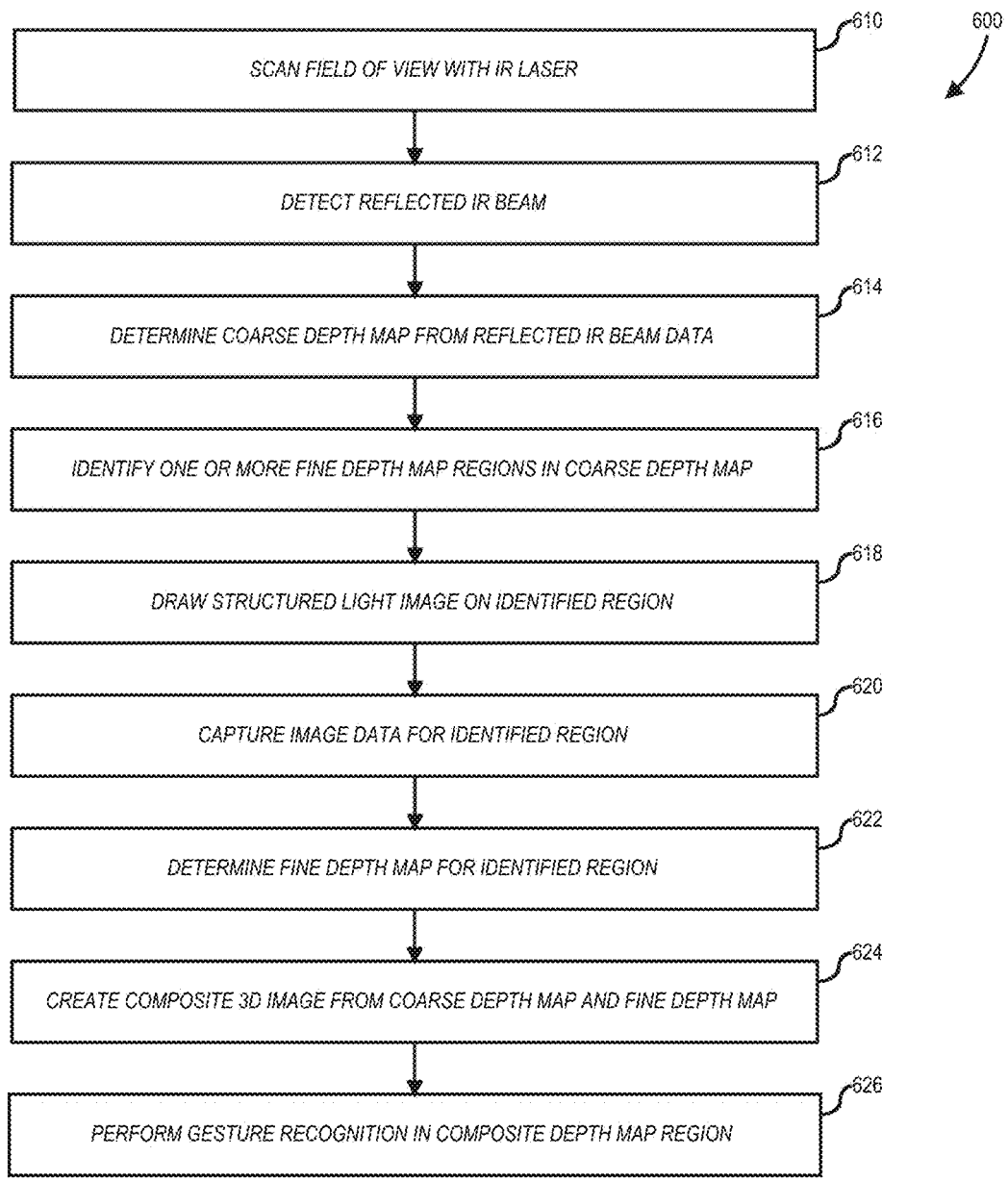
FIG. 6 is a flow diagram of a method to create a composite three-dimensional image and gesture recognition utilizing mixed-mode depth detection in accordance with one or more embodiments.

Referring now to FIG. 6, a flow diagram of a method to create a composite three-dimensional image and gesture recognition utilizing mixed-mode depth detection in accordance with one or more embodiments will be discussed. FIG. 6 illustrates one particular order and number of the operations of method 600, whereas in other embodiments method 600 may include more of fewer operations in various other orders, and the scope of the claimed subject matter is not limited in these respects. At block 610 field of view (FOV) 210 of display 100 may be scanned with an infrared (IR) laser beam. At block 612, the reflected IR beam may be detected, and a coarse depth map may be obtained from reflected IR beam data at block 614. One or more fine depth map regions may be identified at block 616 in the coarse depth map. A structured light image may be drawn in the identified fine depth map region at block 618, and image data for the identified fine depth map region may be captured at block 620. A fine depth map for the identified fine depth map region may be obtained at block 622. A composite three-dimensional (3D) image may be created at block 624 from the coarse depth map and the fine depth map. Gesture recognition may then be performed in the composite depth map at block 626.

Figure 7:
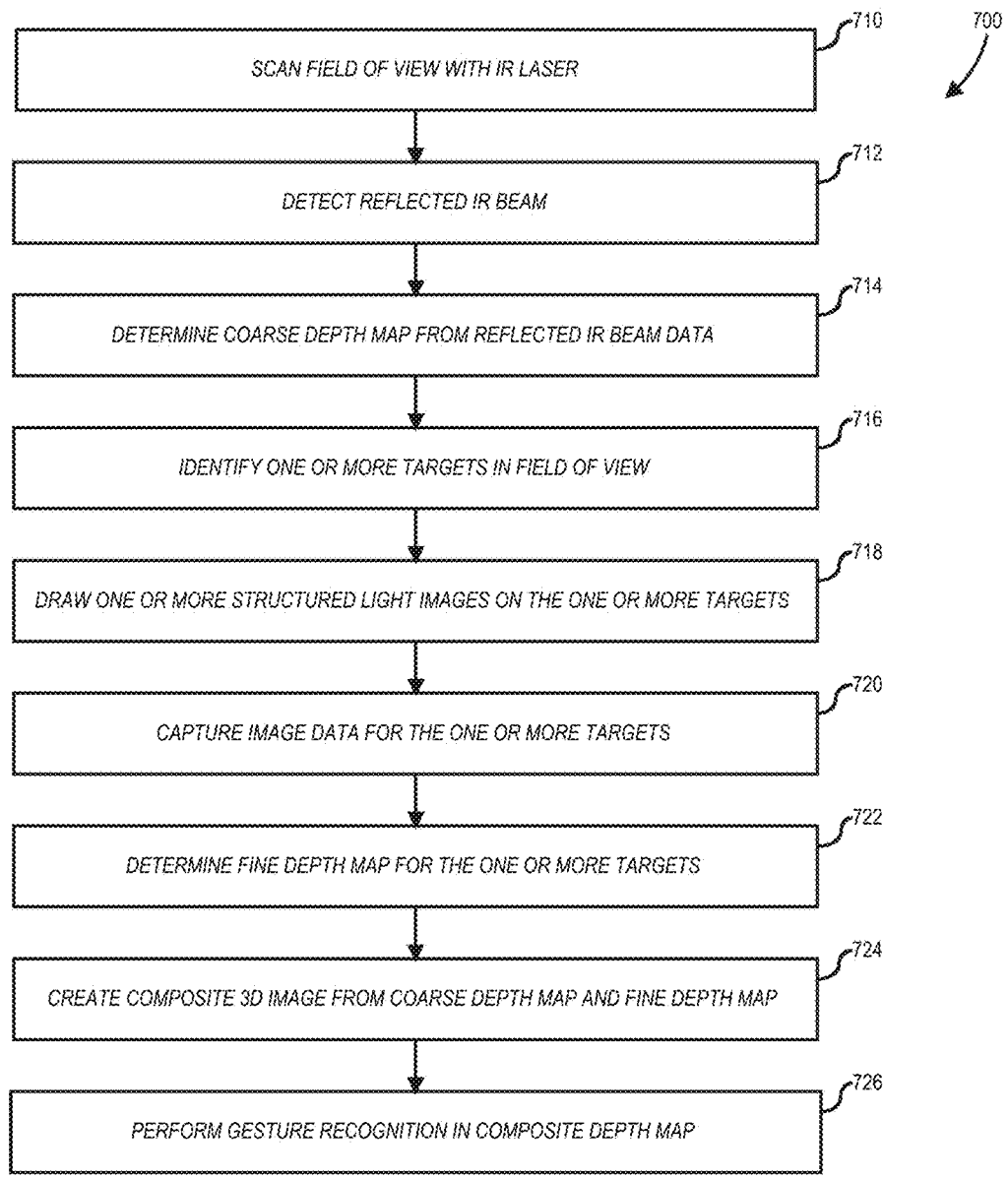
FIG. 7 is a flow diagram of an alternative method to create a composite three-dimensional image and gesture recognition utilizing mixed-mode depth detection in accordance with one or more embodiments.

Referring now to FIG. 7, a flow diagram of an alternative method to create a composite three-dimensional image and gesture recognition utilizing mixed-mode depth detection in accordance with one or more embodiments will be discussed. FIG. 7 illustrates one particular order and number of the operations of method 700, whereas in other embodiments method 700 may include more of fewer operations in various other orders, and the scope of the claimed subject matter is not limited in these respects. At block 710, the field of view (FOV) of display 100 may be scanned with an infrared (IR) laser beam, and the reflected IR beam may be detected at block 712. A coarse depth map may be determined from the reflected IR beam data at block 714. One or more targets in the field of view may be identified at block 716, for example using the coarse depth map. One or more structured light images may be drawn on the one or more targets at block 718. Image data for the one or more targets may be captured at block 720, and a fine depth map for the one or more targets may be determined at block 722. A composite three-dimensional (3D) image may be created from the coarse depth map and the fine depth map at block 724. Gesture recognition may be performed in the composite depth map for one or more of the targets at block 726.

Figure 8:
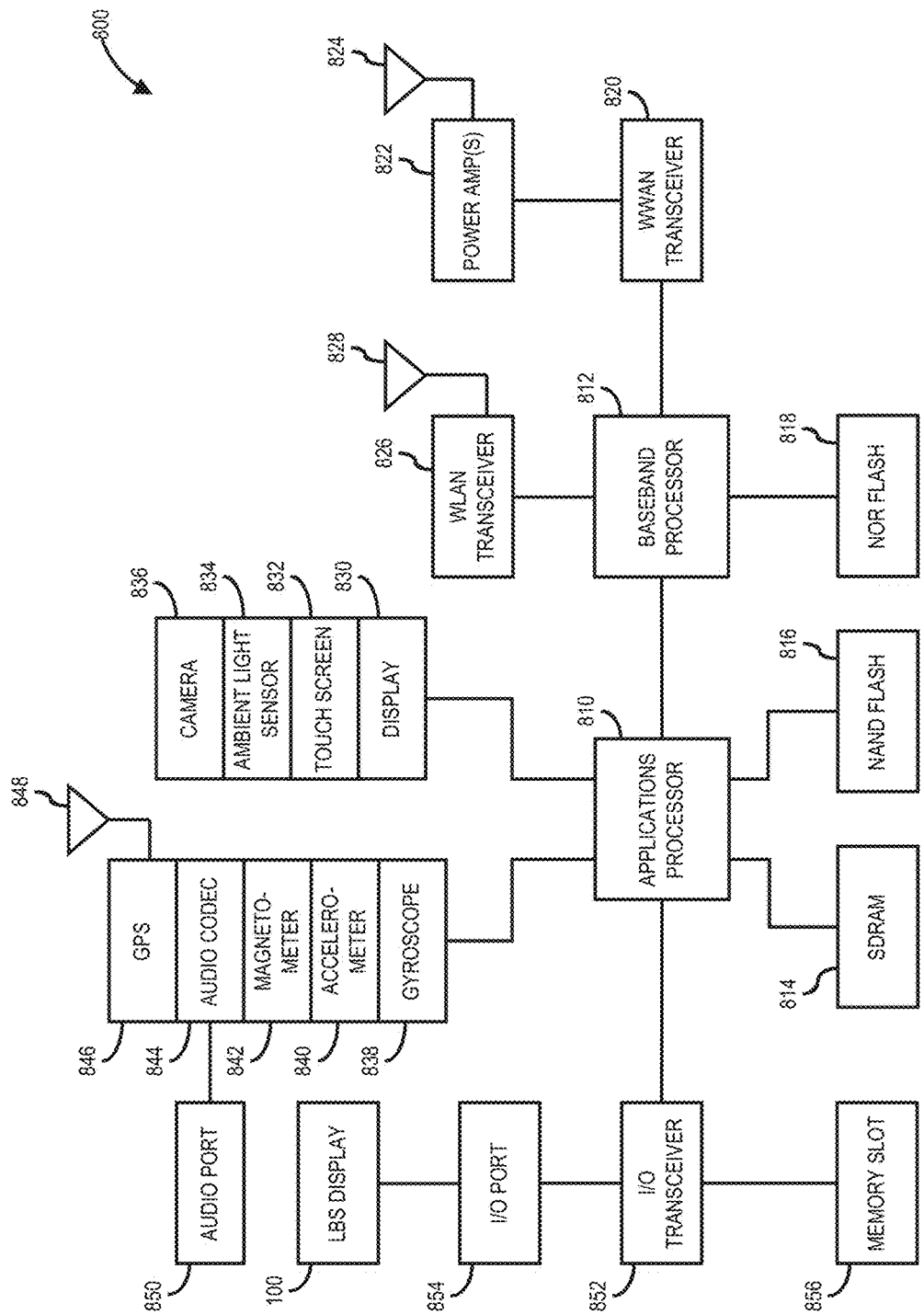
FIG. 8 is a block diagram of an information handling system having a MEMS laser beam display utilizing mixed-mode depth detection in accordance with one or more embodiments.

Referring now to FIG. 8, a block diagram of an information handling system having a MEMS laser beam display utilizing mixed-mode depth detection in accordance with one or more embodiments will be discussed. Although information handling system 800 represents one example of several types of computing platforms, such as a smartphone, tablet, hand held gaming device, personal computer or the like, information handling system 800 may include more or fewer elements and/or different arrangements of elements than shown in FIG. 8, and the scope of the claimed subject matter is not limited in these respects. Information handling system 800 may utilize the MEMS laser beam display 100, for example as a projection display to project an image on a display surface, and further to implement mixed-mode depth detection and/or gesture recognition as described herein, although the scope of the claimed subject matter is not limited in these respects.

In one or more embodiments, information handling system 800 may include an applications processor 810 and a baseband processor 812. Applications processor 810 may be utilized as a general purpose processor to run applications and the various subsystems for information handling system 800. Applications processor 810 may include a single core or alternatively may include multiple processing cores, for example wherein one or more of the cores may comprise a digital signal processor or digital signal processing core. Furthermore, applications processor 810 may include a graphics processor or coprocessor disposed on the same chip, or alternatively a graphics processor coupled to applications processor 810 may comprise a separate, discrete graphics chip. Applications processor 810 may include on board memory such as cache memory, and further may be coupled to external memory devices such as synchronous dynamic random access memory (SDRAM) 814 for storing and/or executing applications during operation, and NAND flash 816 for storing applications and/or data even when information handling system 800 is powered off. In one or more embodiments, instructions to operate or configure the information handling system 800 and/or any of its components or subsystems to operate in a manner as described herein may be stored on an article of manufacture comprising a non-transitory storage medium. In one or more embodiments, the storage medium may comprise any of the memory devices shown in and described herein, although the scope of the claimed subject matter is not limited in this respect. Baseband processor 812 may control the broadband radio functions for information handling system 800. Baseband processor 812 may store code for controlling such broadband radio functions in a NOR flash 818. Baseband processor 812 controls a wireless wide area network (WWAN) transceiver 820 which is used for modulating and/or demodulating broadband network signals, for example for communicating via a Third Generation (3G) or Fourth Generation (4G) network or the like or beyond, for example a Long Term Evolution (LTE) network. The WWAN transceiver 820 couples to one or more power amps 822 respectively coupled to one or more antennas 824 for sending and receiving radio-frequency signals via the WWAN broadband network. The baseband processor 812 also may control a wireless local area network (WLAN) transceiver 826 coupled to one or more suitable antennas 828 and which may be capable of communicating via a Wi-Fi, Bluetooth, and/or an amplitude modulation (AM) or frequency modulation (FM) radio standard including an IEEE 802.11 a/b/g/n standard or the like. It should be noted that these are merely example implementations for applications processor 810 and baseband processor 812, and the scope of the claimed subject matter is not limited in these respects. For example, any one or more of SDRAM 814, NAND flash 816 and/or NOR flash 818 may comprise other types of memory technology such as magnetic memory, chalcogenide memory, phase change memory, or ovonic memory, and the scope of the claimed subject matter is not limited in this respect.

In one or more embodiments, applications processor 810 may drive a display 830 for displaying various information or data, and may further receive touch input from a user via a touch screen 832 for example via a finger or a stylus. An ambient light sensor 834 may be utilized to detect an amount of ambient light in which information handling system 800 is operating, for example to control a brightness or contrast value for display 830 as a function of the intensity of ambient light detected by ambient light sensor 834. One or more cameras 836 may be utilized to capture images that are processed by applications processor 810 and/or at least temporarily stored in NAND flash 816. Furthermore, applications processor may couple to a gyroscope 838, accelerometer 840, magnetometer 842, audio coder/decoder (CODEC) 844, and/or global positioning system (GPS) controller 846 coupled to an appropriate GPS antenna 848, for detection of various environmental properties including location, movement, and/or orientation of information handling system 800. Alternatively, controller 846 may comprise a Global Navigation Satellite System (GNSS) controller. Audio CODEC 844 may be coupled to one or more audio ports 850 to provide microphone input and speaker outputs either via internal devices and/or via external devices coupled to information handling system via the audio ports 850, for example via a headphone and microphone jack. In addition, applications processor 810 may couple to one or more input/output (I/O) transceivers 852 to couple to one or more I/O ports 854 such as a universal serial bus (USB) port, a high-definition multimedia interface (HDMI) port, a serial port, and so on. Furthermore, one or more of the I/O transceivers 852 may couple to one or more memory slots 856 for optional removable memory such as secure digital (SD) card or a subscriber identity module (SIM) card, although the scope of the claimed subject matter is not limited in these respects. In one or more embodiments, the MEMS laser beam display may 100 be coupled to one or more of the I/O transceivers 852 and may be integrated within a housing of information handling system 800 or alternatively may be disposed exterior to the housing, although the scope of the claimed subject matter is not limited in these respects.

Figure 9:
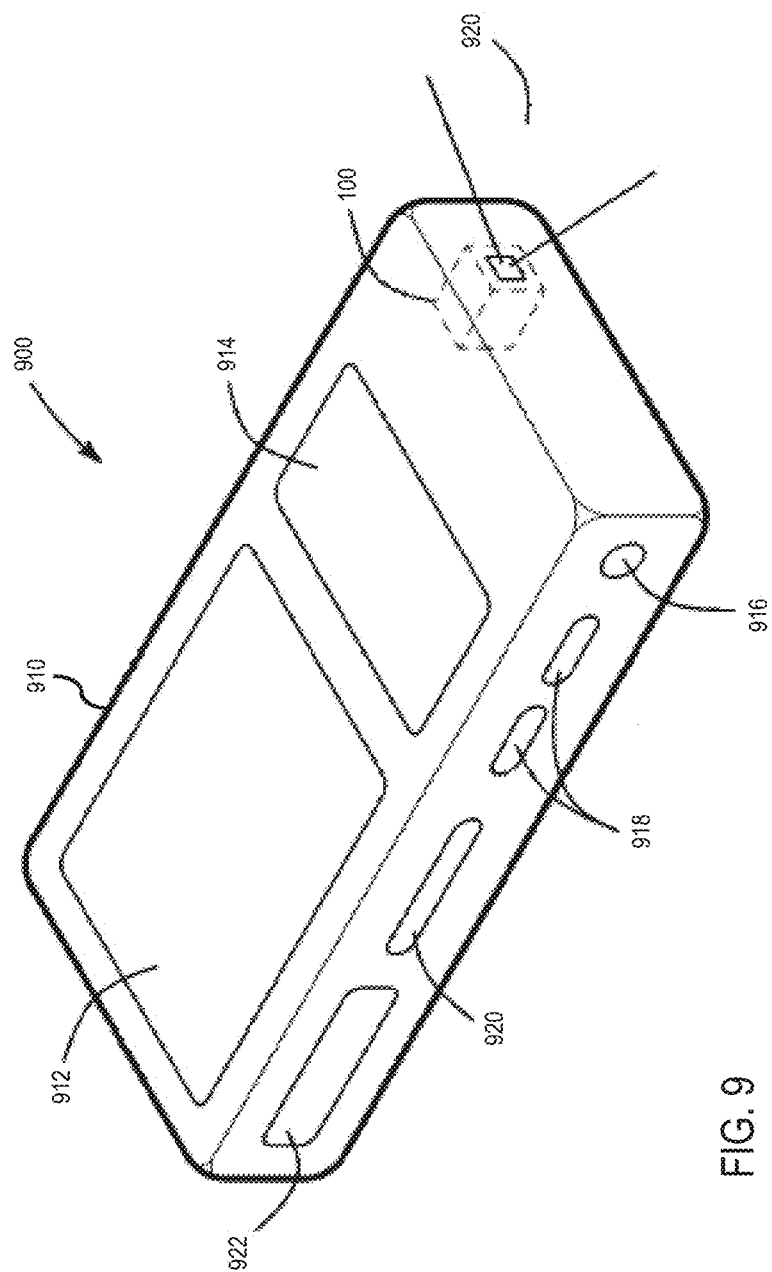
FIG. 9 is an isometric view of an information handling system that includes a MEMS laser beam display utilizing mixed-mode depth detection in accordance with one or more embodiments.

Referring now to FIG. 9, an isometric view of an information handling system that includes a MEMS laser beam display 100 utilizing mixed-mode depth detection in accordance with one or more embodiments will be discussed. The information handling system 900 of FIG. 9 may represent a tangible embodiment of the information handling system 800 of FIG. 8. Information handling system 900 may comprise any of several types of computing platforms, including cell phones, personal digital assistants (PDAs), netbooks, notebook computers, internet browsing devices, tablets, pads, and so on, and the scope of the claimed subject matter is not limited in these respects. In the example shown in FIG. 9, information handling system 900 may comprise a housing 910 to house MEMS laser beam display 100 as discussed herein, for example to provide a scanned output beam 920 to project an image and/or to provide mixed-mode depth detection as discussed herein. Information handling system 900 optionally may include a display 912 which may be a touch screen display, keyboard 914 or other control buttons or actuators, a speaker or headphone jack 916 with optional microphone input, control buttons 918, memory card slot 920, and/or input/output (I/O) port 922, or combinations thereof. Furthermore, information handling system 900 may have other form factors and fewer or greater features than shown, and the scope of the claimed subject matter is not limited in these respects.

Figure 10:
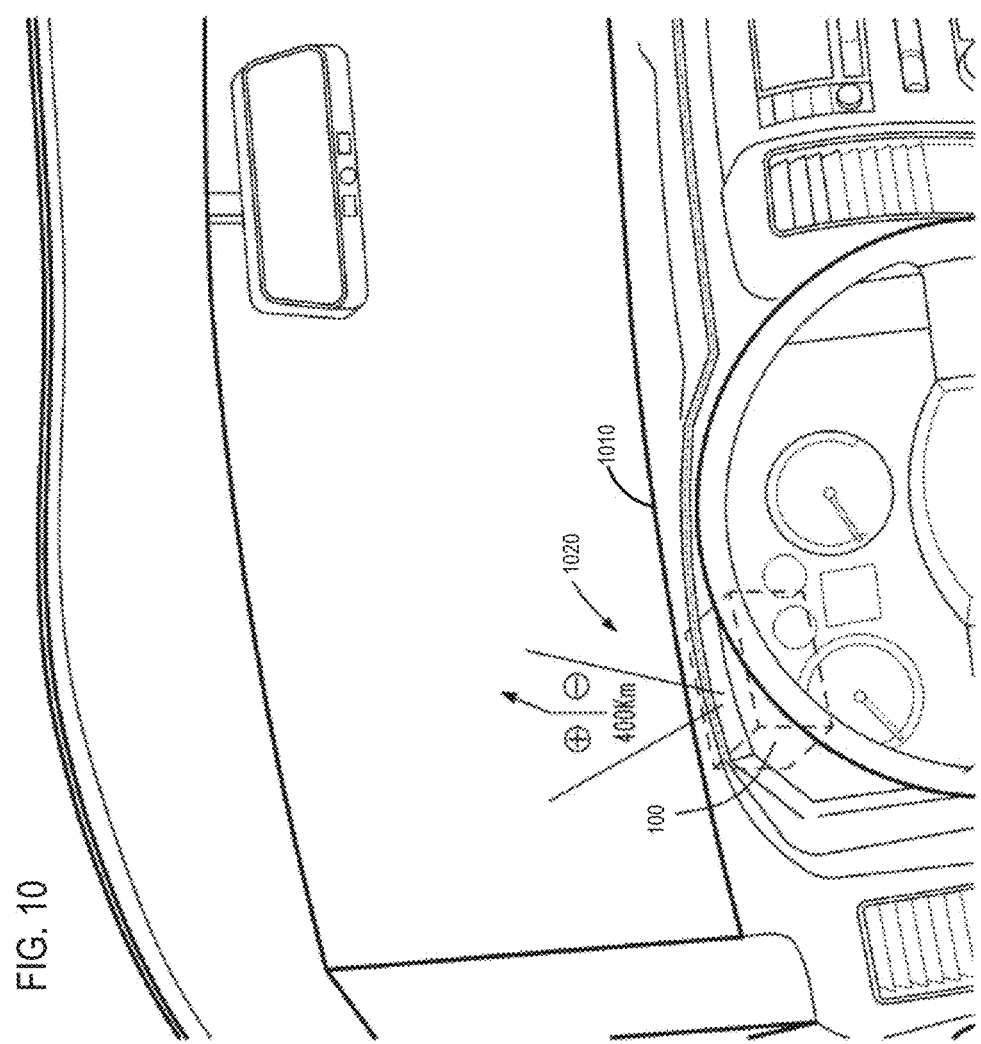
FIG. 10 is a diagram of a vehicle that includes a MEMS laser beam display utilizing mixed-mode depth detection deployed as a head-up display (HUD) in accordance with one or more embodiments.

Referring now to FIG. 10, a diagram of a vehicle that includes a MEMS laser beam display utilizing mixed-mode depth detection deployed as a head-up display (HUD) in accordance with one or more embodiments will be discussed. In the embodiment shown in FIG. 10, the MEMS laser beam display 100 may be deployed in a vehicle 1010 such as in the dashboard of the automobile 1010, and which may project an image 1020 that may be viewable by an operator or passenger of the vehicle. Although FIG. 10 shows one example deployment of a MEMS laser beam display 100 utilizing mixed-mode depth detection as a display projector, other types of deployments likewise may be provided, and the scope of the claimed subject matter is not limited in this respect.

Figure 11:
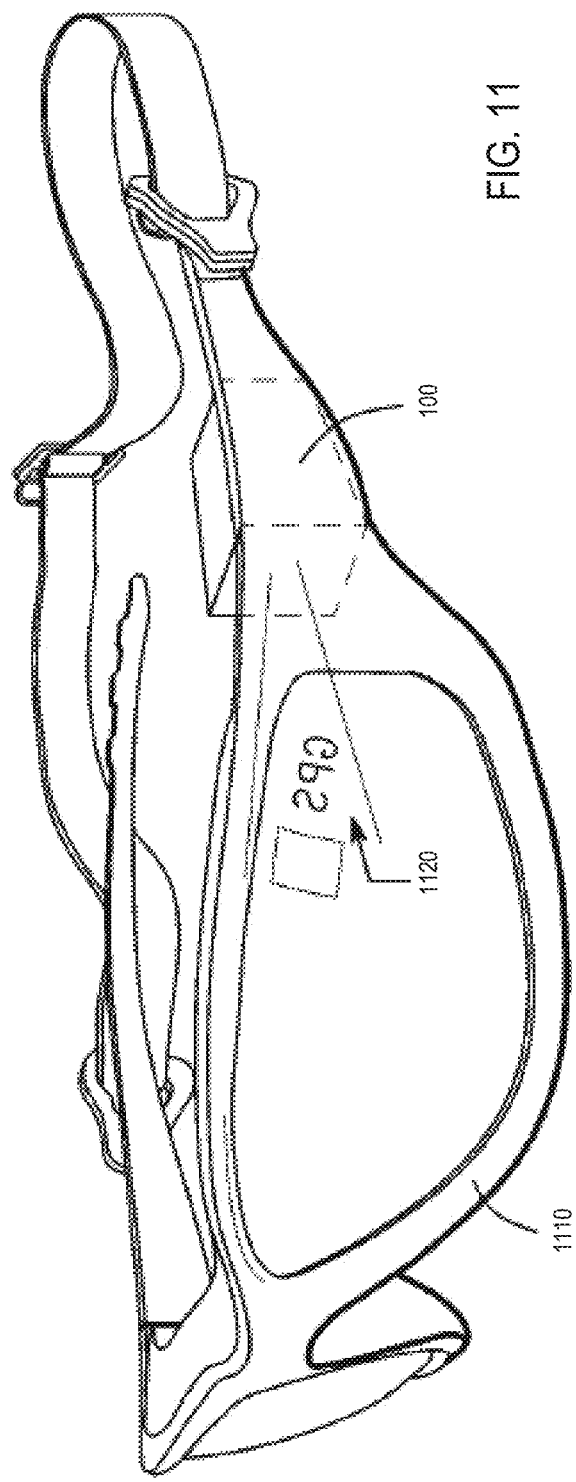
FIG. 11 is a diagram of eyewear that includes a MEMS laser beam display utilizing mixed-mode depth detection deployed as a head-mounted display (HMD) in accordance with one or more embodiments.

Referring now to FIG. 11, a diagram of eyewear that includes a MEMS laser beam display utilizing mixed-mode depth detection deployed as a head-mounted display (HMD) in accordance with one or more embodiments will be discussed. In the embodiment shown in FIG. 11, the MEMS laser beam display beam scanner 100 may be deployed in eyewear 1110 or other head worn device, for example attached to a frame of the eyewear 1110, and which may project an image 1120 that may be viewable by the wearer of the eyewear 1110. Although FIG. 11 shows one example deployment of a MEMS laser beam display 100 utilizing mixed-mode depth detection as a display projector, other types of deployments likewise may be provided, and the scope of the claimed subject matter is not limited in this respect.

Although the claimed subject matter has been described with a certain degree of particularity, it should be recognized that elements thereof may be altered by persons skilled in the art without departing from the spirit and/or scope of claimed subject matter. It is believed that the subject matter pertaining to mixed-mode depth detection and many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A MEMS laser beam display, comprising:
   at least one source of laser light configured to generate a laser beam;
   an imaging engine configured to reflect the laser beam in a pattern to project an image in a field of view of the MEMS laser beam display;
   a time of flight (TOF) depth detector configured to receive reflections of the laser beam from a target to determine a distance to the target within the field of view via a time of flight calculation in a first mode of depth detection, wherein the TOF depth detector determines three-dimensional (3D) coarse depth data of the target;
   depth processing circuitry to identify one or more regions in the field of view from the 3D coarse depth data, where the one or more regions include of only a portion of the field of view, and wherein the imaging engine is further configured to project at least one on structured light pattern in the identified one or more regions while not projecting the at least one structured light pattern outside the identified one or more regions in the field of view;
   a structured light depth detector configured to detect a reflection of the at least one structured light pattern from the target to determine a distance to the target in the one or more identified regions in a second mode of depth detection, wherein the structured light depth detector determines three-dimensional (3D) fine depth data of the target in the one or more identified regions; and
   wherein the depth processing circuitry is further configured to generate a composite three-dimensional (3D) image of the target using a combination of the 3D coarse depth data and the 3D fine depth data for the one or more identified regions.

2. The MEMS laser beam display of claim 1, wherein the depth processing circuitry is further configured to identify a gesture in the one or more identified regions using the 3D fine depth data.

3. The MEMS laser beam display of claim 1, wherein the imaging engine comprises a microelectromechanical system (MEMS) scanner, or a nanoscale scanner, or a combination thereof.

4. The MEMS laser beam display of claim 1, wherein the TOF depth detector comprises a photodetector to detect the received reflections of the laser beam from the target.

5. The MEMS laser beam display of claim 1, wherein the structured light depth detector comprises a camera to detect the reflection of the at least one structured light pattern, and to determine a distance to the target via distance calculation on the detected reflection of the structured light pattern.

6. The MEMS laser beam display of claim 1, further comprising an actuator to receive an input from a user to direct one or more structured light patterns emitted by the imaging engine to a selected region of the target.

7. The MEMS laser beam display of claim 1, wherein the depth processing circuitry is further configured to obtain a skeletal model of the target from the 3D coarse depth data obtained by the TOF depth detector, and to use the skeletal model to determine the one or more identified regions of the target to direct a structured light pattern to obtain the 3D fine depth data.

8. The MEMS laser beam display of claim 1, wherein the laser beam includes an infrared (IR) beam, and the TOF depth detector comprises an IR photodetector to detect the reflection of the IR beam off the target.

9. The MEMS laser beam display of claim 1, wherein the at least one structured light pattern includes a visible structured light pattern or an invisible structured light pattern, or a combination thereof, on the target, and the structured light depth detector comprise a camera to detect the visible structured light pattern or the invisible structured light pattern, or a combination thereof, reflected off the target.

10. The MEMS laser beam display of claim 1, wherein the 3D coarse depth data and the 3D fine depth data are determined from the pattern of the laser beam generated by the imaging engine during a same frame.

11. The MEMS laser beam display of claim 1, wherein the 3D coarse depth data is determined is determined from the pattern of the laser beam generated by the imaging engine during a first frame, and wherein the 3D fine depth data is determined from the pattern of the laser beam generated by the imaging engine during a second frame, where the second frame sequentially follows the first frame.

12. A method to obtain a three-dimensional image of a target, comprising:
    projecting a scanned beam in a field of view onto the target;
    detecting a reflection of the scanned beam reflected off the target;
    determining a three-dimensional (3D) coarse depth map of the target from the reflection of the scanned beam by calculating a time of flight of the scanned beam;
    identifying one or more regions in the 3D coarse depth map in which to obtain fine depth data, where the one or more regions include of only a portion of the field of view;
    projecting a structured light pattern in the one or more regions with the scanned beam while not projecting the structured light pattern outside the one or more regions in the field of view;
    determining a three-dimensional (3D) fine depth map of the target in the one or more regions from a reflection of the structured light pattern by calculating depth information from a reflection of the structured light pattern from the one or more regions; and
    obtaining a three-dimensional image the target using a composite of the 3D coarse depth map and the 3D fine depth map.

13. The method of claim 12, wherein said projecting a scanned beam comprises projecting an infrared (IR) beam, and said detecting comprising detecting the reflection of the IR beam using an IR photodetector.

14. The method of claim 12, wherein said identifying comprises obtaining a skeletal model of the target from the 3D coarse depth map, wherein the one or more regions are located on the skeletal model of the target.

15. The method of claim 12, further comprising gesture recognition for the one or more regions to identify one or more gestures of the target.

16. The method of claim 12, further comprising gesture recognition for the one or more targets to identify one or more gestures for the one or more targets.

17. The method of claim 12, wherein said projecting a scanned beam and said projecting a structured light pattern comprises projecting the scanned beam and projecting the structured light patterned during a same frame.

18. The method of claim 12, wherein said projecting a scanned beam comprises projecting the scanned beam during a first frame and wherein said projecting a structured light pattern projecting comprises projecting the structured light patterned during a second frame, where the second frame sequentially follows the first frame.

19. A method to obtain a three-dimensional image of a target, comprising:
   projecting a scanned beam in a field of view onto the target;
   detecting a reflection of the scanned beam reflected from the field of view;
   determining a three-dimensional (3D) coarse depth map from the reflection of the scanned beam by calculating a time of flight of the scanned beam;
   identifying one or more targets in the field of view using the 3D coarse depth map, where the one or more targets include only a portion of the field of view;
   drawing a structured light pattern on the one or more targets with the scanned beam while not drawing the structured light pattern outside the one or more targets in the field of view;
   capturing image data for the one or more targets from a reflection of the structured light pattern from the one or more targets;
   determining a three-dimensional (3D) fine depth map for the one or more targets from the image data by calculating depth information from a reflection of the structured light pattern from the one or more targets; and
   obtaining a three-dimensional image of the one or more targets using the 3D fine depth map.

20. The method of claim 19, wherein said projecting a scanned beam comprises projecting an infrared (IR) beam, and said detecting comprising detecting the reflection of the IR beam using an IR photodetector.

21. The method of claim 19, wherein said identifying comprises obtaining a skeletal model of the one or more targets from the 3D coarse depth map, wherein structured light patterns are drawn on one or more regions of the skeletal model.

* * * * *